United States Patent
Bharadwaj et al.

(10) Patent No.: US 11,269,752 B1
(45) Date of Patent: Mar. 8, 2022

(54) SYSTEM AND METHOD FOR UNSUPERVISED ANOMALY PREDICTION

(71) Applicant: Eugenie Technologies Private Limited, Mumbai (IN)

(72) Inventors: Shivam Bharadwaj, Mumbai (IN); Nitish Pant, Dehradun (IN); Abhishek Raj, Muzaffarpur (IN); Soudip Roy Chowdhury, Kolkata (IN)

(73) Assignee: Eugenie Technologies Private Limited, Mumbai (IN)

( * ) Notice: Subject to any disclaimer, the term of this patent is extended or adjusted under 35 U.S.C. 154(b) by 0 days.

(21) Appl. No.: 17/369,849

(22) Filed: Jul. 7, 2021

(51) Int. Cl.
| | |
|---|---|
| *G06F 11/00* | (2006.01) |
| *G06F 11/30* | (2006.01) |
| *G06F 11/32* | (2006.01) |
| *G06N 3/08* | (2006.01) |
| *G06F 11/07* | (2006.01) |
| *G06K 9/62* | (2022.01) |

(52) U.S. Cl.
CPC ...... *G06F 11/3072* (2013.01); *G06F 11/0757* (2013.01); *G06F 11/0772* (2013.01); *G06F 11/3006* (2013.01); *G06F 11/327* (2013.01); *G06K 9/6256* (2013.01); *G06N 3/088* (2013.01)

(58) Field of Classification Search
CPC .. G06F 11/008; G06F 11/3466; G06F 11/328; G06F 11/3452; G06F 11/0766; G06F 11/3003; G06F 11/3089
See application file for complete search history.

(56) References Cited

U.S. PATENT DOCUMENTS

| | | | | |
|---|---|---|---|---|
| 6,876,988 | B2* | 4/2005 | Helsper | G06F 11/3447 706/21 |
| 7,016,825 | B1* | 3/2006 | Tryon, III | G06F 30/23 703/6 |
| 2010/0313072 | A1* | 12/2010 | Suffern | G06F 11/0793 714/37 |
| 2016/0116375 | A1* | 4/2016 | Yamada | G01M 99/005 702/34 |
| 2018/0173216 | A1* | 6/2018 | Spiro | G05B 23/0237 |

* cited by examiner

*Primary Examiner* — Charles Ehne
(74) *Attorney, Agent, or Firm* — Wiley Rein LLP

(57) ABSTRACT

Some embodiments are associated with a system and method for deep learning unsupervised anomaly prediction in Internet of Things (IoT) sensor networks or manufacturing execution systems. The system and method use an unsupervised predictive GAN model with multi-layer perceptrons (MLP) as generator and discriminator.

10 Claims, 4 Drawing Sheets

SYSTEM AND METHOD FOR UNSUPERVISED ANOMALY PREDICTION

RELATED APPLICATIONS

This application claims priority benefit of Indian Patent Application No. 202121023322, filed May 25, 2021, which are incorporated entirely by reference herein for all purposes.

FIELD

The invention relates to systems and methods in the field of computer science, and in particular to the deep learning unsupervised anomaly prediction in Internet of Things sensor networks.

BACKGROUND ART

Advancements in the field of sensor technology and communication networks have led to the development of Internet of Things (IoT) sensor networks. See Marjani Monsen, et. Al., *Big IoT data analytics: architecture, opportunities, and open research challenges*, IEEE Access 5, 2017. The IoT sensor networks consist of the systems of interconnected computing devices, mechanical and digital machines which are provided with unique identifiers (UIDs) and the ability to transfer data over a network without/with minimum human-human or human-machine interactions. This makes it very easy for an engineer located at a remote location to monitor these complex processes and to take preventive actions if, such a need arises. One of the most important tasks in such situations is the detection of anomalies.

Anomalies in machinery may lead to unscheduled downtime of machines and processes that disrupts the operational continuity and impacts the bottom-line for process and manufacturing industries. A study shows that an industry like oil and gas upstream suffers more than 27 days of unscheduled downtime which cost around $88 Million on average. Other than economic impact, asset failures might also lead to a catastrophic impact on lives and livelihoods.

Anomalies are the data instances whose statistical behavior is very different from the data generated during a normal mode of operation. An example of anomaly can be an instance taking values that are either very high or very low compared to the values generated by time-series during the normal mode of operation. See Gupta, Manish, *Outlier detection for temporal data: A survey*, IEEE Transactions on Knowledge and Data Engineering 26, 9, 2250-2267, 2013. Given an instance of a multivariate time series data, anomaly detection algorithm should be able to classify it as an anomalous or non-anomalous data.

Several factors make the task of predicting or detecting anomalies difficult as compared to the other binary classification problems. First, defining a region in feature space which encompasses all the possible normal behavior is a very difficult task in itself. Also, even if one can define such a region in feature space the boundary of this region is not very precise. As a result, a data instance lying outside this region but very close to it will be declared as an anomaly by the algorithm even if the data instance is normal. In many real-time operations, the current notion of the normal behavior of data keeps evolving so, what seems to be normal behavior of data at present might not remain the same as the time passes by. Often, the observations coming from the sensing devices that are the part IoT network contains a lot of noise which can be misunderstood as an anomaly by the anomaly detection system. So, there is also an obvious challenge that comes as a result of noise in the data. These reasons along with several other factors render the task of anomaly detection a challenging problem.

In most of the practical situations occurrence of anomaly is a rare event so obtaining the labels for the anomalous data instance is not possible. Therefore, unsupervised learning algorithms are most suited for the task of anomaly detection. See Ahmed, Mohiuddin, et. al., *A survey of network anomaly detection techniques*, Journal of Network and Computer Applications, 2016; Chandola, Varun, et. al., *Anomaly detection: A survey*, ACM computing surveys (CSUR), 2009.

Prior work such as filtering-based models, multivariate time-series models using neural networks are used for building diagnostic and prognostic health monitoring systems. See Li, Xiaochuan, et al., *Canonical variable analysis and long short-term memory for fault di-agnosis and performance estimation of a centrifugal com-pressor*, Control Engineering Practice, 72:177-191, 2018. Support vector machine (SVM), Long short-term memory (LSTM), and other deep-learning models are also proposed for prognostic capability. See Sapankevych, Nicholas, et al., *Time series prediction using support vector machines: a survey*, IEEE Computational Intelligence Magazine, 4(2):24-38, 2009; Elsheikh, Ahmed, et al., *Bidirectional handshaking lstm for remaining useful life prediction*, Neurocomputing, 323:148-156, 2019. However, these approaches require to see the full dataset for the pre-processing, and if the class distribution of training and new data differs these approaches don't scale. There are also different sampling and classification techniques proposed to deal with class-imbalance problems, such as SMOTE. See Chawla, Nitesh, et al., *Smote: synthetic minority over-sampling technique*, Journal of artificial intelligence research, 16:321-357, 2002 However, the loss of temporal feature due to such sampling technique doesn't make them well-suited for the time-series stream data analysis.

Models based on auto-encoder architecture requires one to train these models on normal data instances and hence present operational constraints. Since in most of the practical situations the anomalous instances are very rare (5-15% of the total data-set), generative models with adversarial training become an obvious choice for the anomaly detection task. Although generative adversarial networks (GANs) have proven to be very successful in generating high-quality images using a lower-dimensional noise input, their use in generating good quality sequential data is still very limited. See Goodfellow, Ian, et. al., *Generative adversarial nets*, In Advances in neural information processing systems. 2672-2680, 2014.

In the past, GANs have been used to produce polyphonic music with recurrent neural networks as generator (G) and discriminator (D), or to generate real-valued medical time series using a conditional version of recurrent GAN. See Mogren, Olof, C-RNN-GAN: *Continuous recurrent neural networks with adversarial training*, arXiv preprint arXiv:1611.09904, 2016; Esteban, Cristobal, et. al., *Real-valued (medical) time series generation with recurrent conditional gans*, arXiv preprint arXiv:1706.02633, 2017. In addition to these two models, GANs have been used to generate anomaly score in multivariate time-series (MAD-GAN). See Li, Dan, et. al., *Anomaly detection with generative adversarial networks for multivariate time series*, arXiv preprint arXiv:1809.04758, 2018; Li, Dan, et. al., MAD-GAN: *Multivariate anomaly detection for time series data with generative adversarial networks*, In International Conference on Artificial Neural Networks. Springer, 703-716, 2019. In MAD-GAN, both the discriminator and generator are LSTM networks and the net anomaly score is a convex combination of the anomaly score generated by generator and discriminator.

The presence of different types of failures (short machine downtime due to planned maintenance, long machine failures up to days, weeks, and months, etc.) makes it difficult for the machine learning algorithm to learn accurately the decision boundary between normal and warning classes. As a result, prediction of anomalies in these multivariate IoT time-series becomes an important but challenging task. Thus, it warrant a continuous improvement of the anomaly prediction ability of existing MAD-GAN architecture.

SUMMARY OF THE INVENTION

In view of the foregoing, the present invention provides a unsupervised GAN based system and method for anomaly prediction in complex IoT sensor networks. One object of the present invention is to address the class imbalance issues for predictive intelligence on stream data. The other object of the present invention is to improve the anomaly prediction ability of existing MAD-GAN architecture.

The present invention provides a system architecture of a web-accessible operational intelligence tool and alerting engine configured to accurately predict the risk of machine failures and explain the reason behind such failures to the practitioners. The present invention also addresses the issues related to lack of labeled data in practice. The present invention has consistently outperformed other state-of-the-art techniques and demonstrated superior accuracy.

In accordance with the present disclosure, the present invention herein provides a deep unsupervised anomaly prediction system for multivariate time series in IoT sensor networks. In certain embodiments, the anomaly prediction system comprises data services, a model training and deployment service, and a user interface service. In some aspects, the anomaly prediction system employs a microservice architecture to loosely couple a plurality of services. Individual service communicates with one another over a network to fulfill a goal using technology-agnostic protocols.

In some embodiments, the data services support both stream and batch data coming from the sensors that are fitted onto a machine or from other manufacturing execution systems. The present system supports secured data ingestion over different IoT communication protocols including HTTPS, MQTT, Modbus, Zigbee, and the like.

In some embodiments, the data services comprise a data connector service, a kafka message queue service, a user authorization service and a data pre-processing service. In some aspects, the data pre-processing service may transform the raw time-series data and the transformed data is used as an input feature to train a deep learning model.

In some embodiments, the data pre-processing service uses a feature engineering script to prepare the sensors' data such that the model can learn leading signals for future warning states. In the present invention, the feature engineering script modifies the original features in the sensors' data at two different levels. Firstly, a dimension reduction is applied on the spatial features directly to generate a lower dimension representation of the data. While doing this dimension reduction, 99% of the total variance in the data remains to be captured. Popular dimensional reduction techniques, such as Principle Component analysis (PCA), Independent Component Analysis (ICA), Kernel PCA, Factor analysis and Sparse PCA, are tested on the given data. The transformation that yields a best reconstruction of the original features is selected for dimension reduction. At the second step, the script modifies the sub-sequence of the reduced dimensional time-series. Signal processing tools like Discrete Wavelet Trans-form (DWT) are used to convert a reduced dimensional time-series sub-sequence to approximation and detail sequences. The quantiles of these approximation and detail sequences are used as the temporal features.

The data pre-processing service is configured to characterize the sensors' time series data by a state, wherein the states include at least one of the following: a failed state which characterizes situations that are problematic or inoperational; a warning state which characterizes situations that lead up to a failure; and a normal state which characterizes all other situations. In another embodiment, the data pre-processing service removes the failed state from the data as part of the data preparation step. Accordingly, the deep learning model of the present invention learns patterns from the normal behavior of machines, rather than from the anomaly data.

In some embodiments, the model training and deployment service is configured to receive and store the pre-processed data in a distributed database. In other embodiments, the model training and deployment service comprises a remaining useful life (RUL) calculator and an evidence miner service that query data from the distributed database and persist the learned-model in the Model versions database. The RUL calculator employs an unsupervised GAN model with multi-layer perceptrons as generator and discriminator (MLP-MLP GAN). The MLP-MLP GAN model are deployed into the production through a machine learning application. Once the model is deployed, it calculates the RUL and the risk score of a machine on incoming stream or batch data. The output of the MLP-MLP GAN model is stored in another table in the database.

In some embodiments, the user interface service or consumption platform of the present system is configured to read the output of the MLP-MLP GAN model from the database and visualizes them on the dashboard in the form of insights, along with supporting evidence.

One exemplary embodiment of the invention provides a computer-implemented unsupervised anomaly prediction system, comprising:
  a data service configured to receive time series data from a plurality Internet of Things (IoT) sensors or manufacturing execution system and pre-process the time series data;
  a model training and deployment service configured to receives and stores the pre-processed data from the data service in a distributed database and generate a risk score or a probability for next failure occurring within a time period, wherein the time period ranges from one day to thirty days; and
  a user interface service configured to present the risk score or the probability for the next failure occurring within the time period in the IoT sensor networks or manufacturing execution system on a dashboard along with supporting evidence;
  wherein the data service comprises a data pre-processing service configured to characterize the sensors' time series data by a state, wherein the states include at least one of the following: a failed state which characterizes situations that are problematic or inoperational; a warning state which characterizes situations that lead up to a failure; and a normal state which characterizes all other situations; and wherein the data pre-processing service is configured to remove the time series data characterized as the failed state as part of a data preparation step.

Another exemplary embodiment of the invention herein provides a system of deciding the threshold on risk scores from generator and discriminator networks using Youden's statistics to improve the classification performance by simultaneously increasing the true positive rate and minimizing false-positive rate.

One exemplary embodiment of the invention provides a computer-implemented method for unsupervised anomaly prediction, comprising:

Receiving and pre-processing, via a data service, time series data from a plurality Internet of Things (IoT) sensors or manufacturing execution system;

characterizing, via the data pre-processing service, the sensors' time series data by a state, wherein the states include at least one of the following: a failed state which characterizes situations that are problematic or inoperational; a warning state which characterizes situations that lead up to a failure; and a normal state which characterizes all other situations; and removing, via the data pre-processing service, the time series data characterized as the failed state as part of a data preparation step;

receiving and storing, via a model training and deployment service, the pre-processed data from the data service in a distributed database;

generating a risk score or a probability for next failure occurring within a time period, wherein the time period ranges from one day to thirty days; and presenting, via a user interface service, the risk score or the probability for the next failure occurring within the time period in the IoT sensor networks or manufacturing execution system on a dashboard along with supporting evidence.

Another exemplary embodiment of the invention provides a computer-implemented vehicle performance prediction system, comprising:

a vehicle onboard computer coupled to a plurality of interior and exterior sensors mounted on a vehicle and internal mechanical components for obtaining information related to external surroundings, interior environment, and components conditions;

a data service coupled to the vehicle onboard computer and configured to receive time series data from the plurality of interior and exterior sensors and pre-process the time series data;

a model training and deployment service coupled to the vehicle onboard computer and configured to receives and stores the pre-processed data from the data service in a distributed database and generate a risk score or a probability for next failure occurring within a time period, wherein the time period ranges from one day to thirty days; and a user interface service coupled to the vehicle onboard computer and configured to present the risk score or the probability for the next failure occurring within the time period in the vehicle on a dashboard along with supporting evidence;

wherein the data service comprises a data pre-processing service configured to characterize the sensors' time series data by a state, wherein the states include at least one of the following: a failed state which characterizes situations that are problematic or inoperational; a warning state which characterizes situations that lead up to a failure; and a normal state which characterizes all other situations; and wherein the data pre-processing service is configured to remove the time series data characterized as the failed state as part of a data preparation step.

Further aspects and elements of the invention will be understood by those of skill in the art upon reading the detailed description of specific examples set forth here below.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

Figure 1:
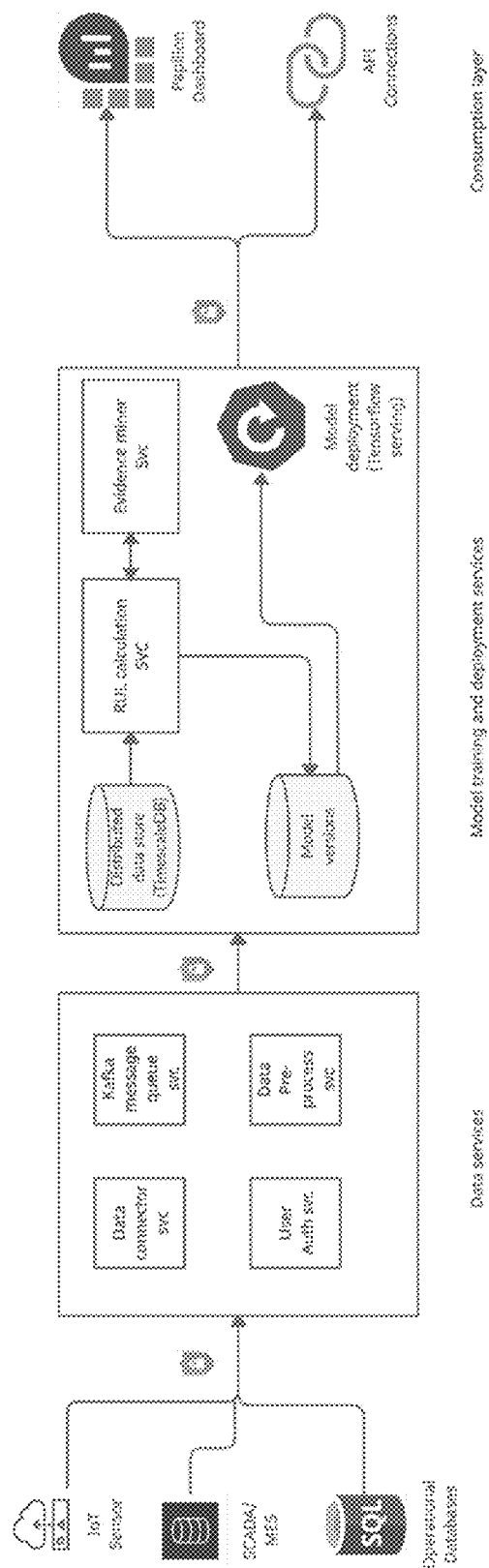
FIG. 1 depicts a general schematic of the system architecture.

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Anomaly" refers to data points which do not conform to an expected pattern of the other items in the data set.

"Outliers" refer to a rare chance of occurrence within a given data set. In Data Science, an Outlier is an observation point which is distant from other observations. An Outlier may be due to variability in the measurement or it may indicate experimental error.

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Kafka" is a message queue reimaged as a distributed commit log. Messages are not deleted when consumed but are all kept on the broker (like a log file keeps line items one after another).

"Mode" refers to a statistical term that refers to the most frequently occurring number found in a set of number.

"Max voting" refers to an ensemble method used for classification problems. In this technique, multiple models are used to make predictions for each data point. The predictions by each model are considered as a 'vote'. The predictions from the majority of the models are used as the final prediction.

"Stacking" is an ensemble learning technique that uses predictions from multiple models to build a new model. This model is used for making predictions on the test set.

"Blending" follows the same approach as stacking but uses only a holdout (validation) set from the train set to make predictions. In other words, unlike stacking, the predictions are made on the holdout set only. The holdout set and the predictions are used to build a model which is run on the test set.

"Bagging" is combining the results of multiple models to get a generalized result.

"Boosting" is an iterative technique which adjusts the weight of an observation based on the last classification. If an observation was classified incorrectly, it tries to increase the weight of this observation and vice versa.

"Time series data", also referred to as time-stamped data, is a sequence of data points indexed in time order. Time-stamped is data collected at different points in time. These data points typically consist of successive measurements made from the same source over a time interval and are used to track change over time "Data stream" refers to a sequence of digitally encoded coherent signals used to transmit or receive information that is in the process of being transmitted. A data stream is a set of extracted information from a data provider.

"Hypertext Transfer Protocol (HTTP)" is an application layer protocol for distributed, collaborative, hypermedia information systems. HTTP is the foundation of data communication for the World Wide Web, where hypertext documents include hyperlinks to other resources that the user can easily access, for example by a mouse click or by tapping the screen in a web browser.

"Message Queuing Telemetry Transport (MQTT)" is a lightweight, publish-subscribe network protocol that transports messages between devices. The protocol usually runs over TCP/IP; however, any network protocol that provides ordered, lossless, bi-directional connections can support MQTT. It is designed for connections with remote locations where a "small code footprint" is required or the network bandwidth is limited. The protocol is an open OASIS standard and an ISO recommendation (ISO/IEC 20922).

"Modbus" is a data communications protocol originally published by Modicon (now Schneider Electric) in 1979 for use with its programmable logic controllers (PLCs). Modbus has become a de facto standard communication protocol and is now a commonly available means of connecting industrial electronic devices.

"Zigbee" is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

"Principal component analysis (PCA)" is the process of computing the principal components and using them to perform a change of basis on the data, sometimes using only the first few principal components and ignoring the rest. PCA is used in exploratory data analysis and for making predictive models. It is commonly used for dimensionality reduction by projecting each data point onto only the first few principal components to obtain lower-dimensional data while preserving as much of the data's variation as possible.

"Independent component analysis (ICA)" is a computational method for separating a multivariate signal into additive subcomponents. This is done by assuming that the subcomponents are non-Gaussian signals and that they are statistically independent from each other. ICA is a special case of blind source separation.

"Kernel principal component analysis (kernel PCA)" is an extension of principal component analysis (PCA) using techniques of kernel methods. Using a kernel, the originally linear operations of PCA are performed in a reproducing kernel Hilbert space.

"Sparse principal component analysis (sparse PCA)" is a specialised technique used in statistical analysis and, in particular, in the analysis of multivariate data sets. It extends the classic method of principal component analysis (PCA) for the reduction of dimensionality of data by introducing sparsity structures to the input variables.

"Discrete wavelet transform (DWT)" is any wavelet transform for which the wavelets are discretely sampled. As with other wavelet transforms, a key advantage it has over Fourier transforms is temporal resolution: it captures both frequency and location information (location in time).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

As illustrated in FIG. 1, the present anomaly prediction system comprises data services, a model training and deployment service, and a user interface service. The anomaly prediction system employs a microservice architecture to loosely couple a plurality of services. Individual service communicates with one another over a network to fulfill a goal using technology-agnostic protocols such as HTTP.

The data services support both stream and batch data coming from the sensors that are fitted onto a machine or from other manufacturing execution systems. The present system supports secured data ingestion over different IoT communication protocols including HTTPS, MQTT, Modbus, Zigbee, and the like. The data for anomaly prediction is time series data. Data includes a timestamp, a set of sensor readings collected at the same time as timestamps, and device identifiers. The goal of anomaly prediction is to predict at the time "t", using the data up to that time, whether the equipment will fail in the near future.

In some embodiments, the data services comprise a data connector service, a kafka message queue service, a user authorization service and a data pre-processing service.

The data pre-processing service may transform the raw time-series data and the transformed data is used as an input feature to train a deep learning model. For example, a wavelet transform-based down-sampling may be used to preserve much more structural information. Popular wavelet transforms include the Haar-2, Daubechies-4, and Daubechies-6 transforms. The general procedure for applying a discrete wavelet transform uses a hierarchical pyramid algorithm that halves the data at each iteration, resulting in fast computational speed.

In some embodiments, the data pre-processing service removes the failed state from the data as part of the data preparation step. The data pre-processing service uses a feature engineering script to prepare the sensors' data such that the model can learn leading signals for future warning states. The data pre-processing service is configured to characterize the sensors' time series data by a state, wherein the states include at least one of the following: a failed state which characterizes situations that are problematic or inoperational; a warning state which characterizes situations that lead up to a failure; and a normal state which characterizes all other situations. For example, label 0 represents the normal functioning machinery (normal state); label 1 represents that the machine is in failing condition (or about to fail in 7 days) (warning state); lastly, Label 2 represents that machine is not operational (failed state). Accordingly, the data pre-processing service removes the failed state of the machine from the applicable dataset of normal, warning and failed state data. Thus, the deep learning model learns patterns from the normal and/or warning behavior of machines, unlike the traditional methods that learn from the anomaly data, which is a salient feature of the present invention. Understandably, if the machine does not have a failed state data yet, it would still be able to predict failure. The model will raise failure alarms or warning when time-series data fall into the warning state. Thus, the proactiveness of the anomaly prediction system can be adjusted by training the prediction model using different pre-failure normal and warning intervals.

In some embodiments, the model training and deployment service receives and stores the pre-processed data in a distributed database, such as TimescaleDB. The model training and deployment service may employ a regression approach to predict when the failure will happen. The remaining useful life (RUL) calculator is configured to calculate how much time is left before the next failure. While predicting RUL, the goal is to reduce the error between the actual RUL and the predicted RUL.

The RUL calculator and evidence miner service are configured to query data from the distributed database and persist the learned-model in the Model versions database. The RUL calculator employs an unsupervised predictive GAN model with multi-layer perceptrons (MLP) as generator and discriminator (MLP-MLP GAN). The predictive MLP-MLP GAN model is trained to generate predicted feature values (e.g. data points) associate with a time series given corresponding values (e.g., data points) of at least one other time series based on prior behavior of the multiple time series. A risk score or probability of next failure occurring within a period ranging from 1 day to 30 days or more is generated based on identifying deviations between the predicted values and actual values associated with the multiple time series.

Figure 2:
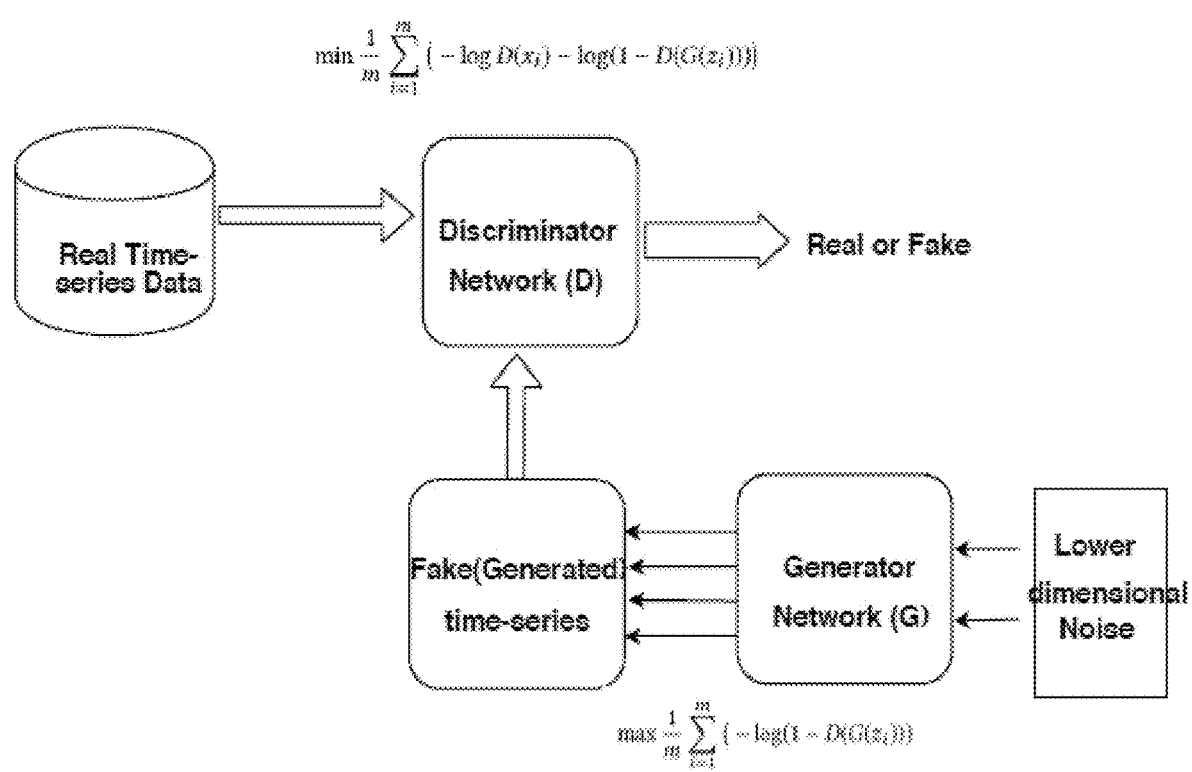
FIG. 2 details a general schematic of generative adversarial network, $x_i$, $i \in \{1, 2, \ldots, m\}$ denotes the real sample and zi denotes a lower-dimensional noise sample.

FIG. 2 shows a general schematic for the GAN architecture used in the present invention. Here, $x_i \in R^{Nf}$, is the original data sample and Nf is the dimensionality of the feature space and $z_i \in R^{N1}$ is the lower dimensional noise in the latent space. The convention $N_f \lessgtr N_1$ is always followed. Also, i is the integer indexing variable such that, $i \in \{1, 2, 3, \ldots, m\}$.

The object of an anomaly prediction task is to determine whether a testing data is generated from the real-data distribution or not. The non-conforming points are called anomalies, outliers or an intrusion. The present system applies MLP (Multi-layer perceptron) for the design of the generator and discriminator models in the GAN architecture.

To prepare the data in a way that is easily understandable by the discriminator and generator network in the GAN architecture, MLP process the time-series data in the form of batches. The training data sequence is denoted by x, $x \in R^{M \times Nf}$ where M is the number of observations and $N_f$ is the number of streams in the multivariate sequence. Nf can also be considered as the dimensionality of the feature space. Each observation is denoted by the vector $x_i$, $x_i \in R^{Nf}$. Similarly the lower dimensional noise input sequence is denoted as $z=z_i$, $i \in \{1, 2, \ldots, m\}$, where, $z_i \in R^{N1}$, $N_1$ is the dimensionality of the latent space. By feeding X and Z to the GAN model, the generator and discriminator are trained with the following two-player minimax game:

$$\min_D \max_G V(D, G) = \mathbb{E}_{x \sim p_{data}(X)}[\log D(x)] + \mathbb{E}_{x \sim p_z(Z)}[\log(1 - D(G(z)))]$$

In a standard GAN framework, the parameters of D and G are updated based on the outputs of D, so that the discriminator can be trained to be as sensitive as possible to assign correct labels to both real and fake sequences, while the generator will be trained to be as smart as possible to fool the discriminator (i.e. to mislead D to assign real labels to fake sequences) after sufficient rounds of iterations. By being able to generate realistic samples, the generator G will have captured the hidden multivariate distributions of the training sequences and can be viewed as an implicit model of the system at normal status. At the same time, the resulting discriminator D has also been trained to be able to distinguish fake (i.e. abnormal) data from real (i.e. normal) data with high sensitivity. A detailed training procedure is shown as follows,

```
for k^th-epoch do
    Generate noise sample in latent space. Z = {z_i, i = 1, . . . , m}
    Conduct discrimination process,
    X = {x_i, i = 1, . . . , m} ⇒ D(X) ≈ 0
    G(Z) ⇒ D(G(Z)) ≈ 1
    Update discriminator parameter by minimizing D_loss
```

$$\min \frac{1}{m} \sum_{i=1}^{m} (-\log D(x_i) - \log(1 - D(G(z_i))))$$

Update generator parameter by minimizing $G_{loss}$ $$\min \frac{1}{m} \sum_{i=1}^{m} (-\log(D(G(z_i))))$$

or
$$\max \frac{1}{m} \sum_{i=1}^{m} (-\log(1 - D(G(z_i))))$$

end

Once the training is completed, one can use both generator and discriminator to generate a risk score for anomaly in all the test-data instances. A detailed process of obtaining risk scores from a discriminator and generator network is described below along with the novel way of combining these two scores to generate net risk scores using Youden's statistics to achieve better anomaly prediction performance.

Discriminator score(Ds)

After the training is completed, the discriminator learns the following mapping from feature space to a binary tuple $$D: R^{Nf} \to \{0,1\}$$

Here, 0 is the label for real data and 1 is the label for fake data (or the data generated by generator network, G). Therefore, if a test data instance $x_i$ is given as an input to the trained discriminator network, the discriminator output $D(x_i)$ represents the probability $P(x_i=1|data)$. Therefore, a user can set the threshold on class probabilities $D(x_i)$ to decide the degree of abnormality of a data instance.

Generator score(Gs)

A trained discriminator learns the following map from latent space to feature space, $$G: R^{Nl} \to R^{Nf}$$

Thus, a generator network will produce sequences that look very close to the real data. for each instance of the test data $x_i$, one sample n random samples from a lower-dimensional latent space. The output of the generator network for these n random samples is a point in feature space. These outputs are denoted by $G(z)=\{G(z_i), \ldots, G(z_n)\}$. Out of these n outputs, the one which is closest to the $x_i$, in the sense of $L^2$ norm is called $G(z^*)$. Then, the reconstruction error given by, $\|x_i - G(z^*)\|_2^2$ is calculated. The amount of reconstruction error incurred for each data instance $x_i$, represents the degree of normality of the test-data instance. this reconstruction error is denoted as Gs.

Combined Score

Since both the Discriminator Score and the Generator Score are a valid parameter in themselves to detect anomalous instances, a combined score can be generated based by taking a convex combination of both these scores.

$$S = \alpha \times D_s + (1-\alpha) \times G_s$$

Youden's J statistic (or Youden's index) is a characteristic parameter used to summarize the performance of a classifier. See Youden, William J, Index for rating diagnostic tests, Cancer 3,1, 32-35, 1950. The value of this index is defined for all points in the receiver operating characteristic (ROC) curve as $$J = sensitivity + specificity - 1$$

A Youden's index value of 1 indicates that the classifier is perfect with no false positives or false negatives. A value of 0 indicates that the classifier is of no use.

To define the cut-off values for all the 3 scores (Ds, Gs and S), Youden's index was calculated for all the points in the respective ROC curves. The threshold was selected to be the value corresponding to which Youden's index was the highest.

Figure 3:
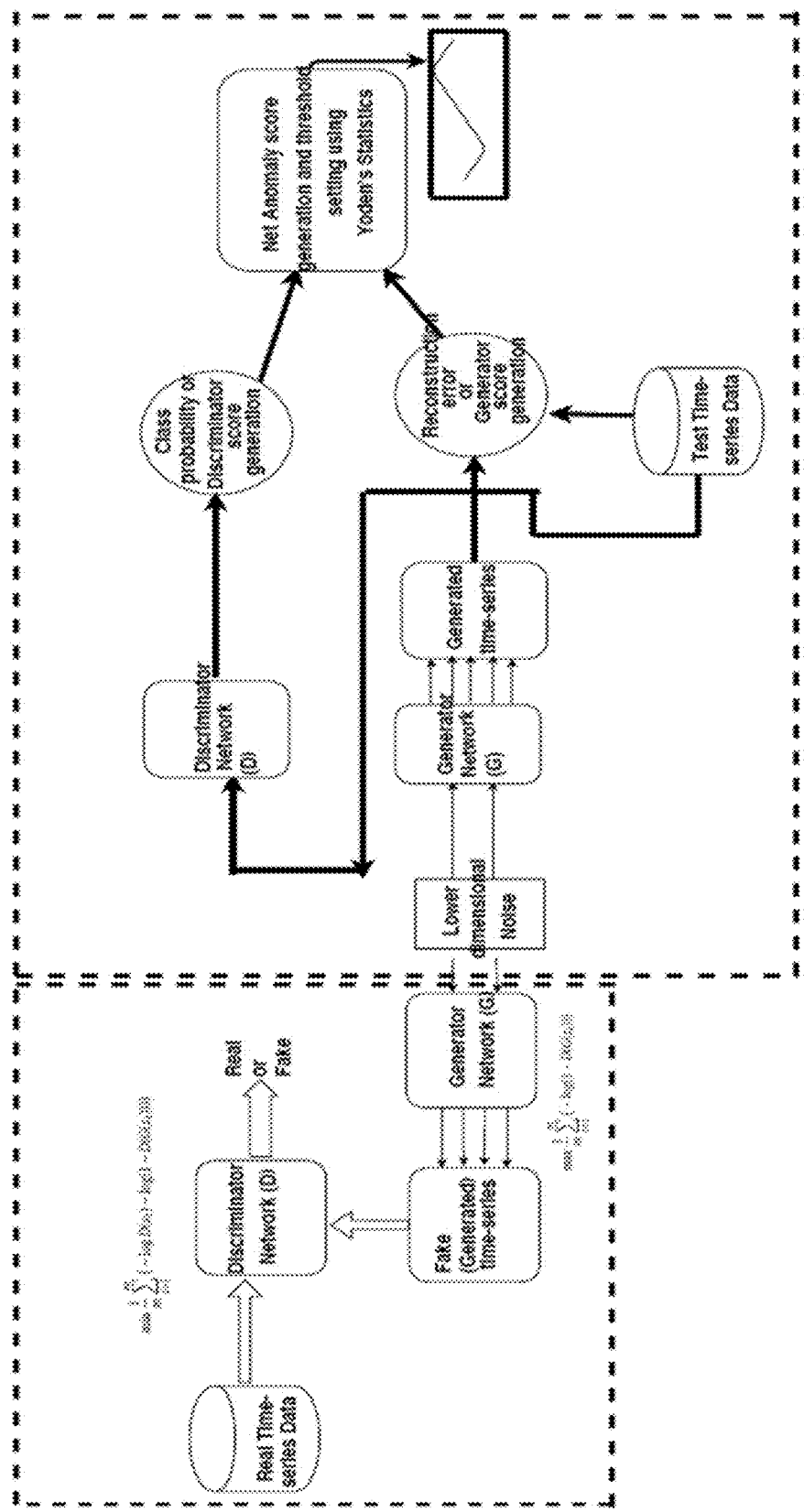
FIG. 3 depicts a schematic of the GAN architecture.

The testing procedure and anomaly score generation for anomaly detection in multivariate time-series data are illustrated as follows, Generator score=[ ]
Discriminator score=[ ]
Combined score=[ ]
for $k^{th}$ test data $x_k^{test}$ do
    Sample N(=50 in our case) samples from the latent space. $Z_{test}=\{z_i, i=1, \ldots, N\}$. Use generator to generate data in the original data space $G(z)=\{G(z_1), \ldots G(z_N)\}$
    Choose the generated sample, $G(z_j)$, which is closest to the test data in the sense of $L_2$ norm. Call it $G(z^*)$
    Calculate the reconstruction error $\|x_k^{test} - G(z^*)\|_2^2$
    $G_s$=Generator score←[Generator score, $(\|x_k^{test} - G(z^*)\|_2^2]$
    $D_s$=Discriminator score←[Discriminator score, $(D(x_k^{test}))$]
    Combined score←[Combined Score,$(\lambda D_s + (1-\lambda)G_s]$, here, $0 \leq \lambda \leq 1$ and $\lambda \in R$
end FIG. 3 illustrates the overall architecture of the predictive MLP-MLP GAN model. In the present MLP-MLP GAN model, the generator has 3 hidden layers with 100 neurons each. While the discriminator has 4 hidden layers with 100-100-50-25 neurons in each layer. The dimensionality of the PCA process is decided by the amount of variance of the total data that is captured by the principle components. The dimensionality of latent-space in the case of PCA was fixed to be 2.

The performance of the present predictive GAN model is evaluated on the basis of standard classification metrics like, accuracy, precision, recall and F1-score as follows, $$accuracy = \frac{TP + TN}{TP + TN + FP + FN}$$

$$precision = \frac{TP}{TP + FP}$$

$$recall = \frac{TP}{TP + FN}$$

$$F1 - Score = 2 \times \frac{precision \times recall}{precision + recall}$$

Here, TP is the correctly detected anomaly (True Positives), FP is the falsely detected anomaly (False Positives), TN is the correctly assigned normal (True Negatives), and FN is the falsely assigned normal (False Negatives). AUC-score for different models is also calculated, which indicates class separation capability of models. Since the problem at hand is detecting anomalies in the data, so the main aim of the system is to detect all the anomalies even if the algorithm raises few false alarms, as long as they are not very high. So, precision, recall and F1-score are important metrics for this particular application compared to accuracy.

In some aspects, the predictive MLP-MLP GAN model can be deployed into the production through machine learning applications like TensorFlow serving, CUDNN, KERAS, and the like. These machine learning applications can enable the specification and training of data models. For example, the model deployment method based on Tensor-Flow serving comprises the following steps: training an initial model through TensorFlow, and deriving the initial model; deploying the initial model to TensorFlow Serving and copying; and deploying the target model into the corresponding path according to the model information in each path copied by the initial model.

Once the model is deployed, it calculates the RUL and the risk score of a machine on incoming stream or batch data. The output of the predictive MLP-MLP GAN models is stored in another table in the database.

Figure 4:
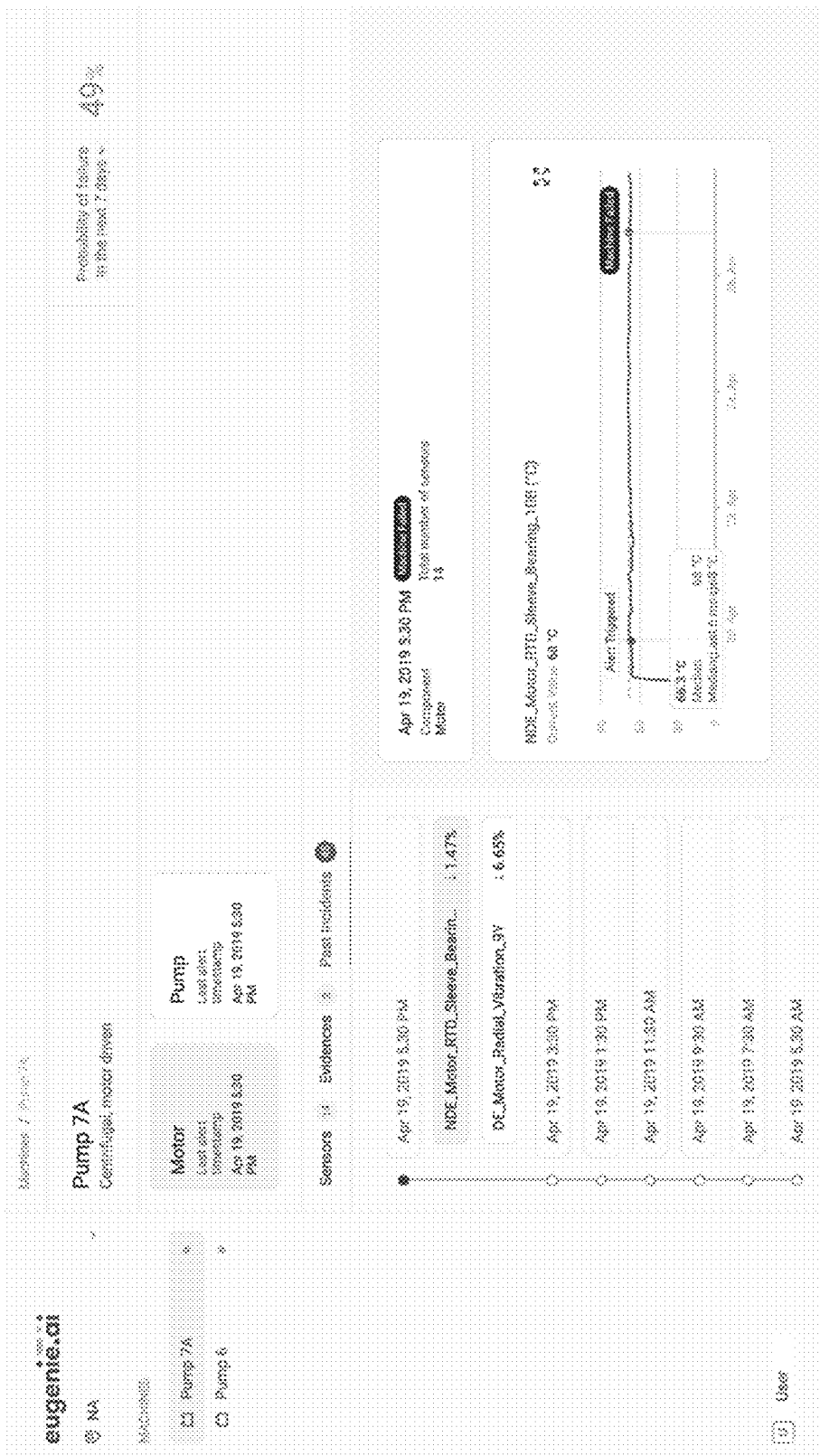
FIG. 4 depicts an exemplary of the operational intelligence dashboard.

The user interface service or consumption platform of the present system reads the output of the predictive MLP-MLP GAN model from the database and visualizes them on the dashboard in the form of insights, along with supporting evidence. FIG. 4 is an exemplary of the operational intelligence dashboard.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

EXAMPLES

Example 1. Application of the Present System with Three Different Data Sets

Data Sets

The first dataset (would also be referred as ONG-PUMP) comprises of the sensor data associate with two pumps that are installed in an upstream operation of an oil rig. The IDs of these pumps are Pump-6 and Pump-7. Pump-6 data consist of 34 sensors data separated by a 3 min interval. Pump-7 data on the other hand consist of 35 sensor's data separated by a time interval, 3-minutes apart. For further analysis the data have been aggregated at an hourly level. These sensors measure various physical parameters of the machine like bearing temperature, vibration etc. There is a column by the name key-phasor, associated with the data of both the pumps. If this parameter takes a value equal to zero then this represents that the machine is shut-down.

This shutdown can be a case of planned down-time or it can be because of normal machine failure. The instantaneous values of the sensor data 7 days prior to the instance when the key-phasor is down, are given the label 1; when the key-phasor remains down for a prolonged period, then in such cases the data is given the label 2.; if the key-phasor is up, the data points are given the label 0. For Prognostic applications, data corresponding to label 1 is of prime importance because one would want the indication of failure at least a few days in advance. After removing the data corresponding to label 2, the number of positive (or failing) class remaining in the data set for Pump-6 are 657 out of total 6,672 points and for Pump-7 it is 331 out of 9072 total data points. As evident from the data the class corresponding to label-1 is very rare. The aim here is to detect the failing points in the time-series one week in advance.

The second dataset (would also be referred as Kaggle-PUMP-data-set) corresponding to water pump of a small area. There are 7 system failures in the entire data-set. The data is a multivariate time-series containing data from 52 sensors. This is a public data-set available on Kaggle (Please visit https://www.kaggle.com/nphantawee/pump-sensor-data for more details). The labels in this data are given in the form of a string, namely, normal, broken, and recovering. Values of the data-set 3 days prior to the state "broken" are assigned the label 1; values of the data-set corresponding to the state "recovering" are assigned the label 2; and the rest of the point are assigned the label 0. In this case after removing the data points corresponding to label 2, the number of total data corresponding to label 1 is 7.67% in the entire dataset. The aim here is to detect the class 1 7 days in advance.

The third dataset (would also be referred as Kaggle-Machine Failure data-set) is a multivariate time-series containing data from 17 sensors. This is a public dataset available on Kaggle (https://www.kaggle.com/c/machine-failure-prediction/overview/evaluation). Other columns of the data-set are operator-ID and date/time information. The labelling is similar to the second dataset. In this case the aim is to predict failures one day in advance because down-time after machine failure was not more than 5 hours in the entire dataset.

Algorithms

The occurrence of a failing class of data with label 1 is a rare phenomenon so it is important for an artificial intelligence-based system to learn the pattern hidden in the data during normal mode of machine functioning. Both supervised and Unsupervised algorithms are used in the current study. Instead of using raw time-series data as the input for the model the quantiles of the Haar transform are used as an input feature.

Four different binary classifiers are tested for their performances, namely, Logistic regression, Random forest classifier, Support vector machines and XG-Boost Classifier. Finally XG-boost classifier with 200 gradient-boosted-decision trees gave the best performance for the 3 different datasets. These classifiers were trained on the initial 70% of the time-series consisting of label 1 and label 0. The performance of the different algorithms is then tested using the entire dataset the detailed results are given in Table 1.

TABLE 1

Performance of the Models

| Type of Algorithm | Dataset | Model Name | Precision | Recall | AUC-Score |
|---|---|---|---|---|---|
| Supervised | ONG-PUMP-6 | XG-BOOST | 76.12 | 94.06 | 0.95 |
| | ONG-PUMP-7 | XG-BOOST | 8.76 | 52.55 | 0.53 |
| | Kaggle-PUMP-dataset | XG-BOOST | 0 | 0 | 0.5 |
| | Kaggle-Machine Failure dataset | 0 | 0 | 0 | 0.5 |
| Unsupervised | ONG-PUMP-6 | Isolation-Forest | 13.5 | 48.47 | 0.48 |
| | ONG-PUMP-7 | Isolation-Forest | 0 | 0 | 0.5 |
| | Kaggle-PUMP-dataset | Isolation-Forest | 99.8 | 1 | 0.994 |
| | Kaggle-Machine Failure dataset | Isolation-Forest | 0 | 0 | 0.5 |
| | ONG-PUMP-6 | One-Class-SVM | 8.76 | 54.09 | 0.532 |
| | ONG-PUMP-7 | One-Class-SVM | 3.5 | 52.6 | 0.513 |
| | Kaggle-PUMP-dataset | One-Class-SVM | 10.6 | 77.6 | 0.638 |
| | Kaggle-Machine Failure dataset | One-Class-SVM | 2.6 | 79.6 | 0.62 |
| | ONG-PUMP-6 | MLP-MLP GAN | 15.4 | 56.7 | 0.634 |
| | ONG-PUMP-7 | MLP-MLP GAN | 8.8 | 100 | 0.803 |
| | Kaggle-PUMP-dataset | MLP-MLP GAN | 32.5 | 35.1 | 0.63 |
| | Kaggle-Machine Failure dataset | MLP-MLP GAN | 17.0 | 57.0 | 0.64 |

The data corresponding to the label 0 is used for training the models and the performance of these trained models are tested using the entire dataset. Isolation Forest, One-class SVM and Generative adversarial networks (GANs) are used for testing in this approach. Results for all the 3 datasets using isolation forest having 300 decision trees are shown in the Table 1. Results for all the 3 datasets using One-class SVM having linear kernel are shown in the Table 1. Different architecture of GANs are also used in this study. The GAN architecture with MLP as discriminator and generator network gave the best results compared to the other architecture where the discriminator and generator network were CNN or Bi-LSTM. the results for this GAN architecture are shown in the Table 1.

The present invention with scalable machine learning algorithms produces accurate predictions irrespective of the presence of a class imbalance in the data, especially applicable to IoT data. The present system may be designed as SaaS (software-as-a-service) offering.

The presence of different types of failures (short machine downtime due to planned maintenance, long machine failures up to days, weeks, and months, etc.,) makes it difficult for the machine learning algorithm to learn accurately the decision boundary between normal and warning classes. Irrespective of that the present algorithm (GAN with MLP as generator and discriminator) has consistently outperformed other state-of-the-art techniques both in recall and AUC scores.

Example 2. Application of the Present System for Computer-Implemented Vehicle Performance Prediction A computer-implemented vehicle performance prediction system, comprising: a vehicle onboard computer coupled to a plurality of interior and exterior sensors mounted on a vehicle and internal mechanical components for obtaining information related to external surroundings, interior environment, and components conditions; a data service coupled to the vehicle onboard computer and configured to receive time series data from the plurality of interior and exterior sensors; a model training and deployment service coupled to the vehicle onboard computer and configured to receives and stores the pre-processed data from the data service in a distributed database and generate a risk score or a probability for next failure occurring within a time period, wherein the time period ranges from one day to thirty days; and a user interface service coupled to the vehicle onboard computer and configured to present the risk score or the probability for the next failure occurring within the time period in the vehicle on a dashboard along with supporting evidence; wherein the data service comprises a data pre-processing service configured to characterize the sensors' time series data by a state, wherein the states include at least one of the following: a failed state which characterizes situations that are problematic or inoperational; a warning state which characterizes situations that lead up to a failure; and a normal state which characterizes all other situations; and wherein the data pre-processing service is configured to remove the time series data characterized as the failed state as part of a data preparation step.

In some embodiments, the data pre-processing service in the system for computer-implemented vehicle performance prediction uses a feature engineering script to prepare the sensors' time series data.

In some embodiments, the model training and deployment service comprises a remaining useful life (RUL) calculator configured to calculate how much time is left before a next failure. In some aspects, the RUL calculator employs an unsupervised predictive GAN model with multi-layer perceptrons (MLP) as generator and discriminator (MLP-MLP GAN). In other aspects, the unsupervised predictive GAN model is trained with the pre-processed data in the normal or the warning state to generate the risk score or the probability of next failure occurring within the time period.

Apart from the use cases mentioned herein, the system and method of the present invention is also applicable for vehicle data and can work fine when the system works on a Vehicle Onboard Computer. This can help predict the insurance risk on a vehicle by training the model on the normal running condition information while anticipating the failure state information or checking historical failure information to predict the necessary corrective measures required for the vehicle.

The invention claimed is:

1. A computer-implemented unsupervised anomaly prediction system, comprising:
    a data service configured to receive time series data from a plurality Internet of Things (IoT) sensors or manufacturing execution system and pre-process the time series data;
    a model training and deployment service configured to receives and stores the pre-processed data from the data service in a distributed database and generate a risk score or a probability for next failure occurring within a time period, wherein the time period ranges from one day to thirty days; and
    a user interface service configured to present the risk score or the probability for the next failure occurring within the time period in the IoT sensor networks or manufacturing execution system on a dashboard along with supporting evidence;
    wherein the data service comprises a data pre-processing service configured to characterize the sensors' time series data by a state, wherein the states include at least one of the following: a failed state which characterizes situations that are problematic or inoperational; a warning state which characterizes situations that lead up to a failure; and a normal state which characterizes all other situations; and
    wherein the data pre-processing service is configured to remove the time series data characterized as the failed state as part of a data preparation step.

2. The system of claim 1, wherein the data pre-processing service uses a feature engineering script to prepare the sensors' time series data.

3. The system of claim 1, wherein the model training and deployment service comprises a remaining useful life (RUL) calculator configured to calculate how much time is left before a next failure.

4. The system of claim 3, wherein the RUL calculator employs an unsupervised predictive GAN model with multi-layer perceptrons (MLP) as generator and discriminator (MLP-MLP GAN).

5. The system of claim 4, wherein the unsupervised predictive GAN model is trained with the pre-processed data in the normal or the warning state to generate the risk score or the probability of next failure occurring within the time period.

6. A computer-implemented method for unsupervised anomaly prediction, comprising:
    receiving and pre-processing, via a data service, time series data from a plurality Internet of Things (IoT)

sensors or manufacturing execution system, wherein the data service comprises a data pre-processing service;

characterizing, via the data pre-processing service, the sensors' time series data by a state, wherein the states include at least one of the following: a failed state which characterizes situations that are problematic or inoperational; a warning state which characterizes situations that lead up to a failure; and a normal state which characterizes all other situations; and removing, via the data pre-processing service, the time series data characterized as the failed state as part of a data preparation step;

receiving and storing, via a model training and deployment service, the pre-processed data from the data service in a distributed database;

generating a risk score or a probability for next failure occurring within a time period, wherein the time period ranges from one day to thirty days; and presenting, via a user interface service, the risk score or the probability for the next failure occurring within the time period in the IoT sensor networks or manufacturing execution system on a dashboard along with supporting evidence.

7. The method of claim 6, wherein the data pre-processing service uses a feature engineering script to prepare the sensors' time series data.

8. The method of claim 6, wherein the model training and deployment service comprises a remaining useful life (RUL) calculator configured to calculate how much time is left before a next failure.

9. The method of claim 8, wherein the RUL calculator employs an unsupervised predictive GAN model with multi-layer perceptrons (MLP) as generator and discriminator (MLP-MLP GAN).

10. The method of claim 9, wherein the unsupervised predictive GAN model is trained with the pre-processed data in the normal or the warning state to generate the risk score or the probability of next failure occurring within the time period.

* * * * *